A. STEPHENSON.
Ticket-Reel.

No. 167,416.            Patented Sept. 7, 1875.

Witnesses:
J. W. Herthel.
Chas. P. Weisner.

Inventor:
Albert Stephenson
per Herthel & Co.
Attys.

UNITED STATES PATENT OFFICE.

ALBERT STEPHENSON, OF ST. LOUIS, MISSOURI.

IMPROVEMENT IN TICKET-REELS.

Specification forming part of Letters Patent No. 167,416, dated September 7, 1875; application filed May 10, 1875.

*To all whom it may concern:*

Be it known that I, ALBERT STEPHENSON, of St. Louis, county of St. Louis and State of Missouri, have invented an Improved Ticket-Reel, of which the following is a specification:

The nature of this invention consists in the formation of a simple device, as will hereinafter appear, for the better holding, protecting, handling, or using street-car tickets, stamps, and the like.

Figure 1:
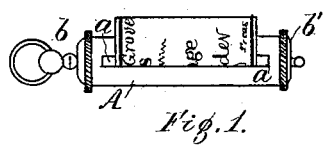
Figure 2:
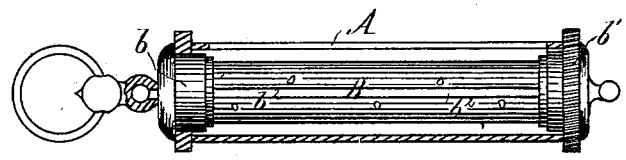
Figure 3:
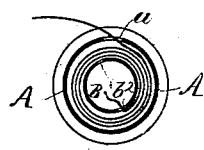

Of the drawing, Figure 1 is a front view of my invention as applied and used. Fig. 2 is an enlarged longitudinal section of my invention. Fig. 3 is an enlarged cross-section of Fig. 2.

This invention consists in utilizing the turning the shaft to perform both functions of coiling the strips of tickets to be contained in a casing around said shaft, as also to uncoil said tickets as occasion or use requires.

Hence, A represents the outside casing. B is the spindle. The spindle I form to have at one end a head, $b$, and when fitted in the casing said head of spindle caps its end of the casing, but in such wise as to allow free turning of said spindle, and as indicated in Figs. 1 and 2. The opposite end of spindle likewise neatly closes its end of the casing by means of its cap or thumb-ring $b^1$. (See Figs. 1 and 2.) By means of the thumb-ring $b^1$ the spindle is turned. The casing A has a running slit, $a$, Figs. 1 and 2, through which the tickets, &c., are inserted into the spindle. To catch hold of the inserted end or edge of the ticket the spindle has one or more running slits, $b^2$, Figs. 2 and 3. For the same purpose the spindle can further have roughened points or teeth, the object being to grasp the inserted tickets, so that some are made to coil about said spindle, or uncoil from same, according to the turning, and as indicated in Fig. 3. The opening $a$ of casing has one or both its edges beveled, forming a cutting-edge to cut and properly detach the tickets, as required.

The manner of using my device and its advantages are apparent.

What I claim is—

A ticket holder or case, having a slit, $a$, for the entrance as well as delivery of the tickets, in combination with a revolving spindle, B, having slits $b^2$, by means whereof the turning of said shaft coils, as well as uncoils, said tickets, substantially in the manner herein shown and described.

In testimony of said invention I have hereunto set my hand.

ALBERT STEPHENSON.

Witnesses:
WILLIAM W. HERTHEL,
CHAS. F. MEISNER.